(12) United States Patent
Naftali et al.

(10) Patent No.: US 11,812,382 B2
(45) Date of Patent: **\*Nov. 7, 2023**

(54) SYSTEM AND METHOD FOR EFFICIENT WAKEUP FOR BEACON RECEPTION

(71) Applicant: Texas Instruments Incorporated, Dallas, TX (US)

(72) Inventors: Oran Naftali, Petah Tikva (IL); Yuval Jakira, Tel-Aviv (IL); Liran Brecher, Kfar Saba (IL); Asaf Even-Chen, Rehobot (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 68 days.

This patent is subject to a terminal disclaimer.

(21) Appl. No.: 17/462,050

(22) Filed: Aug. 31, 2021

(65) Prior Publication Data

US 2021/0400583 A1 Dec. 23, 2021

Related U.S. Application Data

(63) Continuation of application No. 14/987,583, filed on Jan. 4, 2016, now Pat. No. 11,140,627.

(51) Int. Cl.
*H04W 52/02* (2009.01)
*H04W 48/08* (2009.01)
*H04W 84/12* (2009.01)
*H04W 48/12* (2009.01)

(52) U.S. Cl.
CPC ....... *H04W 52/0229* (2013.01); *H04W 48/08* (2013.01); *H04W 48/12* (2013.01); *H04W 84/12* (2013.01); *Y02D 30/70* (2020.08)

(58) Field of Classification Search
None
See application file for complete search history.

(56) References Cited

U.S. PATENT DOCUMENTS

| | | |
|---|---|---|
| 2012/0250537 A1 | 10/2012 | Shatil |
| 2013/0034004 A1 | 2/2013 | Mannemala |
| 2014/0140208 A1 | 5/2014 | Cherian et al. |
| 2014/0376432 A1 | 12/2014 | Smith |
| 2016/0088567 A1 | 3/2016 | Homchaudhuri |
| 2016/0294713 A1 | 10/2016 | Hiremath |

FOREIGN PATENT DOCUMENTS

CN 103891362 A 6/2014

OTHER PUBLICATIONS

The State Intellectual Property Office of P.R.C. Search Report; CN App. No. 201611271614.9; 2 pages.
CN App. No. 201611271614.9 first Office Action dated Sep. 17, 2021 with English Translation.

*Primary Examiner* — Robert M Morlan
(74) *Attorney, Agent, or Firm* — Mandy Barsilai Fernandez; Frank D. Cimino

(57) ABSTRACT

According to an embodiment, a system and method is disclosed for efficient wake up in a wireless communication device for receiving beacons without significantly affecting the battery power and data throughput. Wireless device receives beacons from network such as access points. If beacons are not received as scheduled within defined intervals, then the wireless device determines a pattern of beacon reception timings and uses a weighted score process to select the best possible reception timing pattern and uses it as the schedule for receiving beacons on going forward basis, thus avoiding staying awake at all time to receive misaligned beacons.

29 Claims, 3 Drawing Sheets

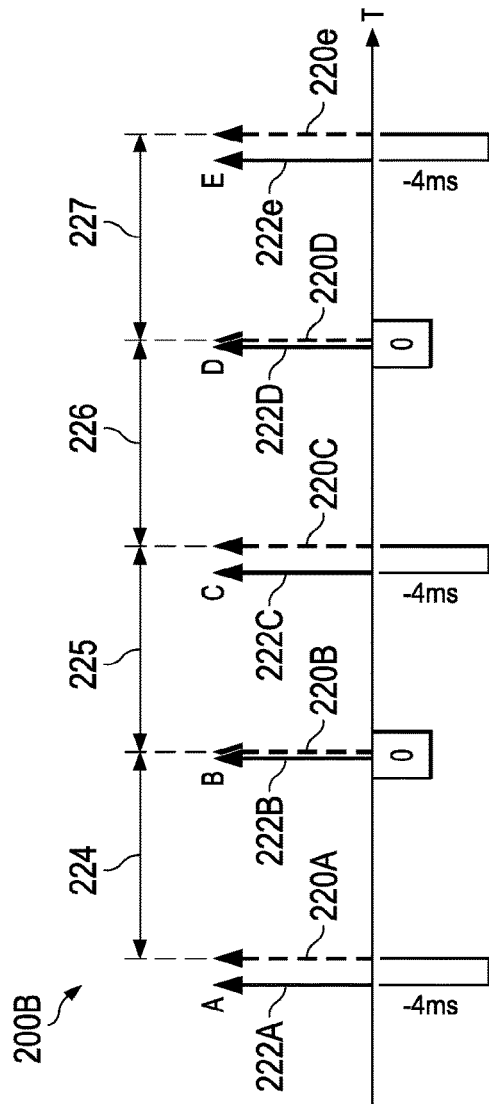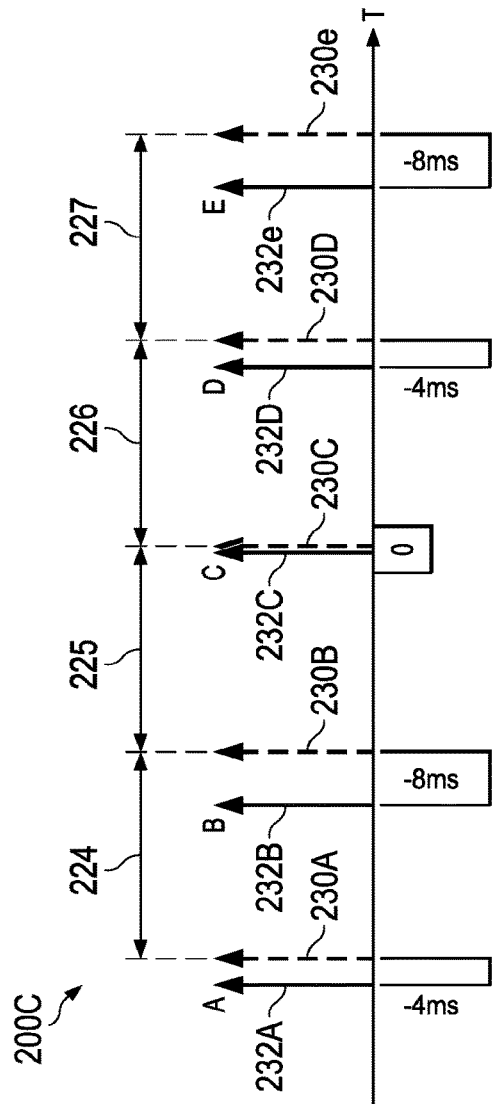

SYSTEM AND METHOD FOR EFFICIENT WAKEUP FOR BEACON RECEPTION

CROSS-REFERENCE TO RELATED APPLICATIONS

This application is a continuation of U.S. patent application Ser. No. 14/987,583, filed on Jan. 4, 2016, the entirety of which is incorporated herein by reference.

TECHNICAL FIELD

This disclosure relates generally to the field of wireless communication and more particularly to beacon reception in wireless communication networks.

BACKGROUND

In wireless communication networks such as Wireless Local Area Networks (WLAN), communication management packets/frames are used to communicate information about the network. These frames are called beacons. Beacons are transmitted by network elements such as Access Points (AP) and include basic information about the network such as network ID, communication parameters, supported data rates, network capability, and other relevant information needed for any wireless device for example, cell phones, PDAs, laptop computers, or any other device capable of wireless communication in the network, to establish connection, stay connected, and communicate with the network element.

Beacons are transmitted periodically at regular intervals (e.g., 100 ms, 50 ms, 102.4 ms, 204.8 ms, or the like) in the network for wireless devices to maintain their connection with the network element and perform many other connection management related functions. Beacon interval is communicated to wireless devices in the network at the time of connection establishment so wireless devices can receive the beacon at a predetermined time and stay connected with the network element. Generally, the beacon interval is a default value selected by the equipment manufacturer of network elements and the interval remains fixed in a network.

Typically, when a wireless device is in idle state and not performing any task, then to preserve battery power, the wireless devices goes to 'sleep' in a power save mode and 'wakes up' after set a set interval, for example every 100 ms, to receive beacon from the network element and stay connected with the network. Although beacons are transmitted at a set interval, beacon intervals can drift due to various conditions such as misalignment of clock synchronization, environmental conditions, network traffic congestion, and the like. In such cases, wireless devices can miss beacons and either assume that the network element is no longer available and start searching for another network element or stay awake and continue to monitor the network environment until they receive the next beacon. If beacon intervals drift for long period of time, then to stay connected with the network, wireless devices stay awake and remain on a channel for the entire duration of beacon interval to continuously monitor the network for beacons. When wireless devices scan the network for beacons, they suspend sending and receiving data packets because that requires wireless devices to change channel for data transmission, which may result in wireless devices missing another beacon. This causes wireless devices to lose battery power relatively faster when connected with the wireless network, especially with a WLAN AP and it also affects the data throughput in the wireless network.

SUMMARY

In accordance with an embodiment an apparatus is disclosed. The apparatus includes a transceiver, and a processing unit coupled to the transceiver. The processing unit is configured to receive a predetermined number of beacons from a network element, determine a reception timing pattern for the predetermined number of beacons, and use the determined reception timing pattern for receiving further beacons from the network element, wherein at least one beacon of the predetermined number of beacons is received prior to or after a scheduled reception time for the at least one beacon.

In accordance with another embodiment, a method is disclosed. The method includes receiving by a processing unit, a predetermine number of beacons from a network element, determining a reception timing pattern for the predetermined number of beacons, and using the determined reception timing pattern for receiving further beacons from the network element, wherein at least one beacon of the predetermined number of beacons is received prior to or after a scheduled reception time for the at least one beacon.

In accordance with yet another embodiment an apparatus is disclosed. The apparatus includes a transceiver for transmitting and receiving data packets, and a processing unit coupled to the transceiver and configured to, receive a predetermined number of beacons from a network element, determine reception timing patterns for the predetermined number of beacons, determine a score for each one of the reception timing patterns, and use a reception timing pattern with at least one of a lowest score or a highest score for receiving further beacons from the network element, wherein at least one beacon of the predetermined number of beacons is received prior to or after a scheduled reception time for the at least one beacon.

BRIEF DESCRIPTION OF THE DRAWINGS

FIG. 2A-C illustrate exemplary patterns of beacon reception timings according to another embodiment.

DETAILED DESCRIPTION

The following description provides many different embodiments, or examples, for implementing different features of the subject matter. These descriptions are merely for illustrative purposes and do not limit the scope of the invention.

Figure 1:
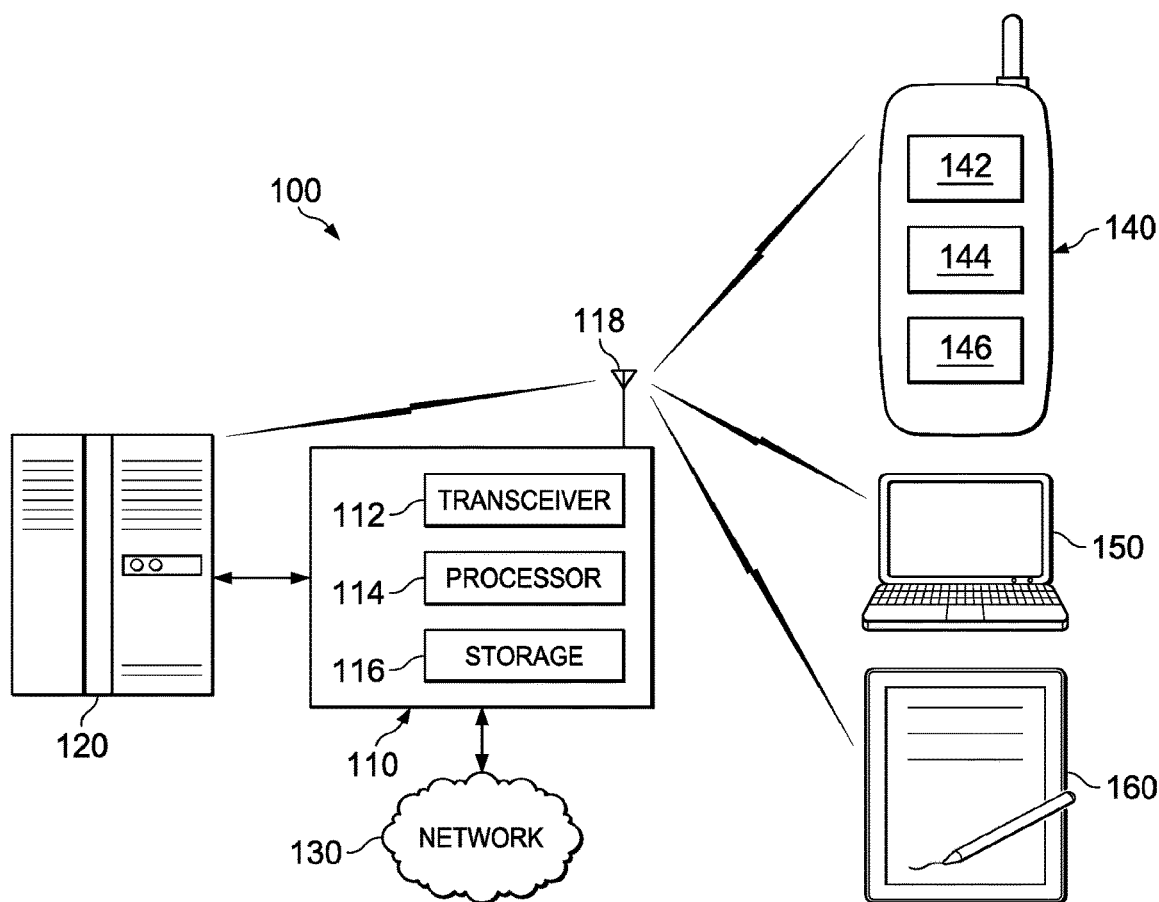
FIG. 1 illustrates an exemplary wireless network according to an embodiment.

Referring to FIG. 1, an exemplary wireless network 100 is illustrated according to an embodiment. Network 100 includes a network element 110. The network element 110 can be any wireless communication network element for example, an access point, a network relay, a network extender, a wireless router, or any other device capable of connecting to a network and provide wireless communication connections to various devices. The network element 110 includes a transceiver 112, a processor 114, a storage device 116, and an antenna 118 among various other system components. Although for explanation, simple elements are shown; however, the network element 110 can have various others system components and multiple elements for example, the network element 110 can have multiple processors, antennas, storage devices, transceivers, displays, user interface, and the like.

The network element 110 is communicatively coupled to a backend network device 120 and a network 130. The network element 110 can be coupled to various other networks and systems to provide network services for example, network element 110 can be connected to content servers, Internet, cellular networks, media service providers, routers, and the like. Further, the network element 110 can be connected to these systems via wireline or wireless communication links or combination thereof. The network 100 includes various wireless communication devices such as for example, a cell phone 140, a laptop computer 150, and a personal digital assistant device (PDA) 160. The network 100 can also include many other devices capable of wirelessly communicating with the network element 110 such as control systems, printers, consumer electronic devices, and various other devices and systems. Further, the network element 110 can also be communicatively coupled to other network elements in a mesh network scheme. Each of these devices, such as the cellular phone 140 may also include various other system components such as a transceiver 142, a processor 144, storage devices 146, and other components like displays, keyboards, an antenna, and the like (not shown).

When a wireless device, such as for example the cell phone 140, establishes a communication with the network element 110, then the network element 110 provides various communication related parameters to the cell phone 140 for the cell phone 140 to effectively communicate with the network element 110. Among many other parameters, the network element 110 also provides beacon interval information to the cell phone 140.

For example, if the manufacturer of the network element 110 sets the beacon interval for network element 110 at 100 milliseconds (100 ms), then the network element 110 provides that information to the cell phone 140. The beacon information can be provided to the cell phone 140 in various ways according to the wireless communication protocol that is used to establish the communication for example, if the network element 110 and the cell phone 140 are capable of communicating with each other using IEEE 802.11 WLAN protocol, then the beacon information will be provided in a Target Beacon Transmission Time (TBTT) field of the management frame. Similarly, for other wireless communication protocols that use beacons for connection management, this information can be provided to the cell phone 140 in appropriate fields of the protocol specific management frames.

In the present example, after receiving the beacon information, the cell phone 140 monitors the channel every 100 ms to receive a beacon from the network element 110. After receiving the beacon, if the cell phone 140 is not actively processing any data, then the cell phone 140 goes into a power saving idle mode to preserve battery power and wakes up again at each 100 ms interval to receive the beacon from network element 110. Typically, electronic signals include jitters, which may cause signal misalignment. Electronic devices typically include a mechanism to adjust minor jitters in the electronic signals; however, if the signal is misaligned for more than any given threshold, which cannot be adjusted, then the signal connection is reestablished to resynchronize the signal reception.

As explained hereinabove, in conventional wireless networks, when a beacon is not received as scheduled, then the cellular phone 140 does not drop the connection with the network element 110 but instead stays awake to monitor the channel for the next beacon from the network element 110. If beacons from the network element 100 are misaligned with the scheduled timing for receiving beacons (e.g., 100 ms), then the cellular phone 140 may end up staying awake longer to ensure it receives beacons from the network element 110 and maintains a proper connection with the network element 110. This causes the cellular phone 140 to lose significant amount of battery power just for receiving beacons and results in poor data throughput. According to an embodiment, when the cellular phone 140 does not receive a beacon as scheduled, the cellular phone 140 initiates an efficient wakeup process to capture beacons from the network element 110 without staying awake for long time and preserves battery power.

Figure 2A:
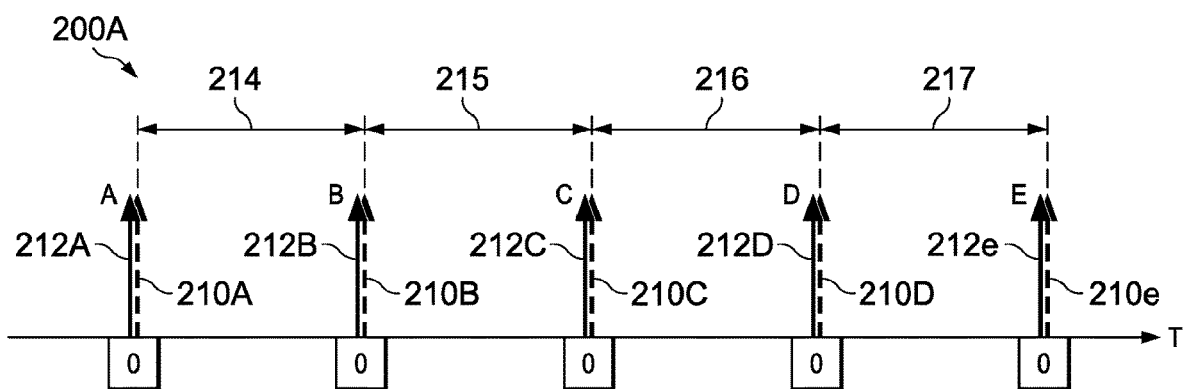

Referring to FIG. 2A, an exemplary beacon reception timing pattern 200A is illustrated according to another embodiment. The illustrated beacon reception timing pattern 200A can be observed at any wireless device for example cellular phone 140 (or computer 150, PDA 160, or the like devices) while communicating with a network element such as the network element 110. The beacon reception timing pattern 200A includes times when beacons are received at the wireless device. Beacons A-E are expected to be received at the wireless device at timings 210a-210e respectively with respective beacon intervals 214-217 according to the wireless connection parameters. Timings 212a-212e are the actual timings when beacons A-E are received by the wireless device. As illustrated, beacons A-E are received with a little jitter; however, the wireless device is able to adjust the jitter and receives the beacon without any significant timing issue. In this example, the wireless device continues to wake up after given intervals 214-217 and receives beacons A-E as expected.

Typically, beacons are misaligned because of various reasons such as clock misalignment, change in the physical environment of the network, or the like. For example, if some physical structure temporarily obstructs the line of sight for the network element and its transmission has to bounce off of the physical structure before it reaches the wireless device with some delay, then that transmission pattern most probably remains the same for a period of time until the obstruction is removed. Similarly, if there are other causes of misalignment of beacon reception, then the misaligned beacon reception pattern remains the same until the causes of misalignment are removed.

Referring to FIG. 2B, an exemplary beacon reception timing pattern 200B with misaligned beacon reception is illustrated according to another embodiment. As illustrated, beacons A-E are scheduled to be received at times 220a-220e; however, beacon A is received at time 222a, which is 4 ms prior to the scheduled reception time 220a, beacon B is received as scheduled, beacon C is received at time 222c, which is 4 ms prior to the scheduled time 220c, beacon D is received as scheduled, and beacon E is received at time 222e, which is 4 ms prior to the scheduled time 220e. Conventionally, a wireless device wakes up at time 220a expecting the beacon A; however, because the beacon A arrived at time 222a, which is 4 ms prior to the scheduled time 220a, the wireless device misses the beacon A and stays awake in full power mode until it receives beacon B, which is received as scheduled at time 220b. After receiving the beacon B, the wireless device goes back to 'sleep' and 'wakes up' at time 220c to receive beacon C; however, the beacon C arrived at time 222*c*, which was 4 ms prior to the scheduled time, the wireless device misses the beacon C and stays 'awake' to receive beacon D. In this example, because the wireless device is not receiving beacons as scheduled, the conventional wireless device stays awake after missing a beacon to continue to capture misaligned beacons and uses up system resources and battery power.

Referring to FIG. 2C, an exemplary beacon reception timing pattern 200C with different misaligned beacon reception pattern is illustrated according to yet another embodiment. As illustrated, beacons A-E are scheduled to be received at times 230*a*-230*e*; however, beacon A is received at time 232*a*, which is 4 ms prior to the scheduled reception time of 230*a*, beacon B is received 8 ms prior to scheduled time at time 232*b*, beacon C is received as scheduled, beacon D is received 4 ms prior to scheduled time at time 232*d*, and bacon E is received at time 232*e*, which is 8 ms prior to the scheduled time 230*e*. As explained in the previous example, a conventional wireless device will stay 'awake' after missing a beacon to continue to receive misaligned beacons and use up significant battery power.

A wireless device according to an embodiment, stays awake after missing a beacon to receive a predetermined number (e.g., 10, 20, 30, 50, or the like) of misaligned beacons and then determines a misalignment pattern for beacon reception. Based on the determination and contrary to the recommended wakeup time communicated by the network element during the connection establishment process, the wireless device adjusts its wakeup time to align its wakeup time with the misaligned pattern of beacon reception timing. This allows the wireless device to save significant amount of battery power by avoiding staying awake to receive misaligned beacons for the wireless connection as typically done in conventional wireless devices.

According to an embodiment, when the wireless device determines that beacons have multiple reception patterns, then the wireless device monitors misaligned beacon reception timing patterns and calculates a best weighted pattern for the next beacon and follows the weighted time pattern until the beacon reception pattern changes again. For example, in exemplary illustrations of FIGS. 2A-C, beacons are received according to some repetitive patterns. Each pattern can be considered as a hypothesis and any statistical weighting mechanism can be used to determine the most likely occurrence of a given pattern and then that given pattern can be used as wakeup time pattern for the wireless device to receive beacons.

In an embodiment, beacon arrival times can be analyzed with respect to each of the patterns from FIGS. 2A-C in parallel. Each pattern then can be scored according to the actual arrival time versus expected arrival time. One of the many possible score calculation methods can be as follows:

$$Score=Score+\alpha(|T1-T2|-Score)$$

T1=Actual beacon arrival time
T2=Expected beacon arrival time
α=score factor

In exemplary embodiment, score value can be initialized to zero and increased as beacon patterns are captured. After a predetermined number of beacons, if the score is below some threshold such as for example below 5000, this may indicate that a beacon pattern has been detected. After the initial detection, the detected pattern can be used for future beacon detection. The beacon pattern is periodically monitored and tracked to ensure that the pattern does not change for example, during periodic monitoring and tracking, if it is determined that the score remains below for example, the previously used threshold 5000, then the possibility is that the beacon pattern has not changed and the current pattern will be used to continue to detect beacons. If for some reason the score exceeds the previously captured threshold (e.g., 5000), then it may indicate that the beacon pattern track has been lost and the new acquisition phase can be restarted. Also, when a pattern is used to receive beacons and a beacon is missed, then it may indicate that the tracking of the pattern is lost or the pattern has changed for various reasons and the process for new pattern acquisition can be restarted.

The term 'score factor' in the above equation determines algorithm's sensitivity to irregular delays that can be added on top of the detected pattern due to certain network events. In some exemplary implementation, a score factor of ⅛ can be used. Other score factors such as ¼, ⅐, ⅒, 1/16, 1/20 or the like can also be used. As the score factor gets higher the score will tend to bounce and beacon patterns may become challenging to monitor and track.

As the score gets lower, the calculation more closely tracks the arrival pattern of beacons. If the score gets higher, then it can reflect a random beacon intervals pattern, which eventually leads to the traditional wake up method. One skilled in the art will appreciate that an exemplary weighted score method is illustrated for determining weighted beacon pattern; however, the method is not limited to any particular weighted score scheme. Any statistical method can be used to determine the success of the best hypothesis to be used as beacon receiving schedule.

Figure 3:
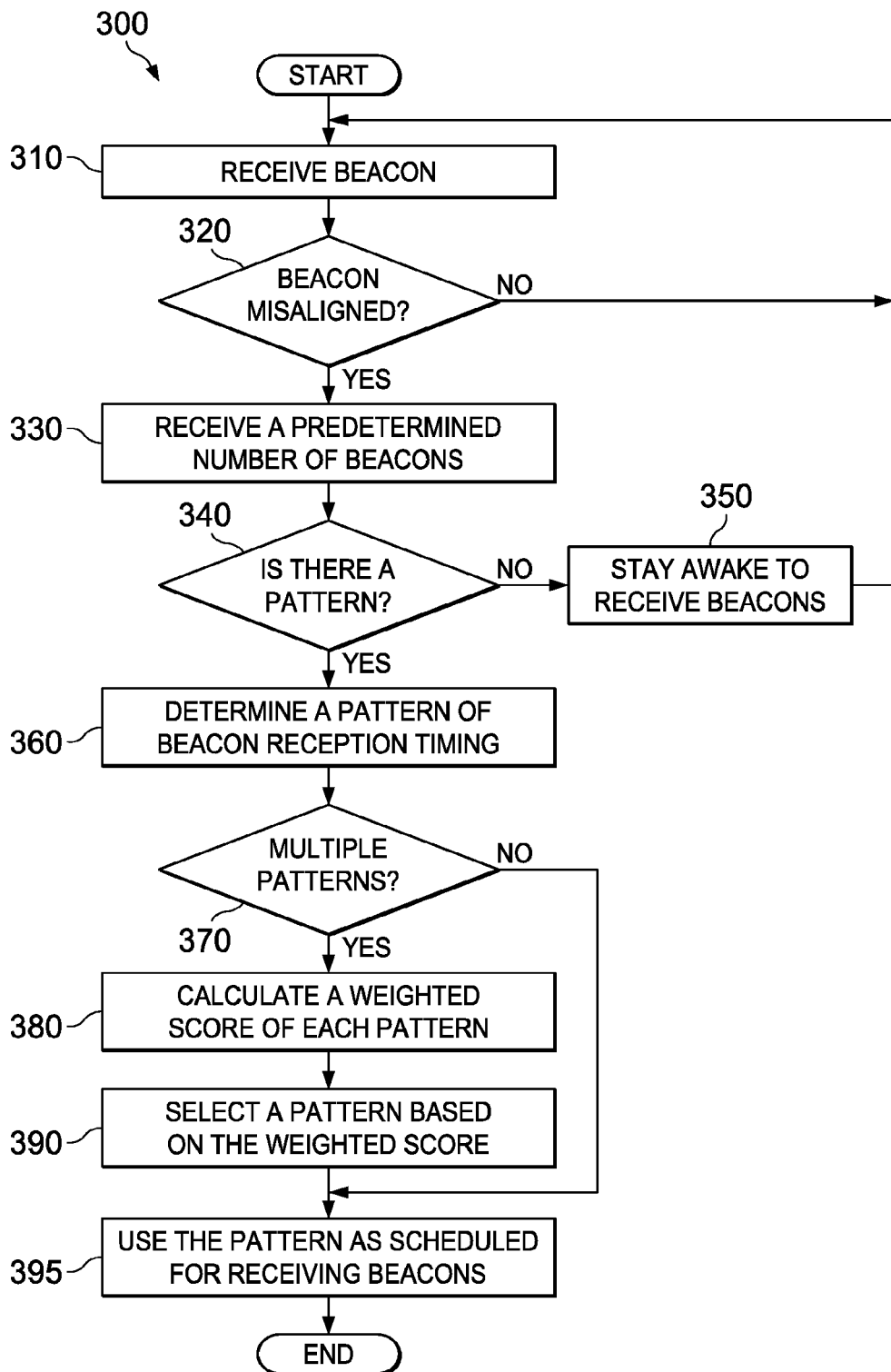
FIG. 3 illustrates an exemplary flow diagram for determining a misaligned beacon pattern for efficient wakeup according to an embodiment.

Referring to FIG. 3, a flow diagram for a process 300 for determining a beacon reception timing is illustrated according to another embodiment. When a wireless device receives a beacon at 310 from a network element for example, an access point, then at 320, the wireless device determines whether the beacon is misaligned from scheduled timing. If the beacon is not misaligned and is received as scheduled, the wireless device continues to receive beacons as scheduled. If the beacon is not received as scheduled and it is misaligned from the actual scheduled time, then at 330, the wireless device receives a predetermined number (e.g., 10, 20, 30, 50 or the like) of beacons.

The wireless device at 340 determines whether there is a pattern of misalignment for beacon reception timings. If there is no pattern and beacons are randomly misaligned, then at 350, the wireless device reverts to conventional scheme of staying awake to receive misaligned beacons. If the wireless device determines that there is a pattern in receiving misaligned beacons, then at 360, the wireless device determines the pattern such as for example illustrated in FIG. 2B or FIG. 2C. The wireless device further determines at 370 if there are more than one pattern of misalignment of beacon reception timings. If there are no more than one pattern, then at 395, the wireless device uses the determined pattern of receiving beacons as schedule for receiving future beacons. If there are more than one misalignment patterns, then at 380, the wireless device calculates a weighted score for each pattern. As explained above, the weighted score can be determined using various statistical methods. After determining the weighted score, at 390, the wireless device selects the best pattern to use for beacon receiving and at 395, the wireless device uses misaligned pattern with the best score as the schedule for receiving beacons from the network element.

The foregoing outlines features of several embodiments so that those of ordinary skill in the art may better understand various aspects of the present disclosure. Those of ordinary skill in the art should appreciate that they may readily use the present disclosure as a basis for designing or modifying other processes and structures for carrying out the same purposes and/or achieving the same advantages of various embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims. Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. An apparatus comprising:
   a transceiver; and
   a processing unit coupled to the transceiver and configured to:
      receive, from a network element, a beacon;
      determine whether the beacon is misaligned from scheduled timing;
      when the beacon is not received as scheduled and is misaligned from the scheduled timing, receive a predetermined number of additional beacons;
      determine whether at least one of the additional beacons are misaligned;
      when an additional beacon is misaligned:
         calculate a weighted score for the misaligned, additional beacon;
         select a misalignment pattern based on the weighted scores; and
         receiving another beacon using the selected misalignment pattern.

2. The apparatus of claim 1, wherein the weighted score is based at least on a probability of repeating a beacon misalignment.

3. The apparatus of claim 1, wherein each beacon in the one or more predetermined number of additional beacons arrive in intervals of at least one of the following:
   50 milliseconds;
   100 milliseconds;
   102.4 ms; and
   204.8 ms.

4. A method comprising:
   receiving, from a network element, a beacon;
   determining whether the beacon is misaligned;
   when the beacon is not received as scheduled and is misaligned from scheduled timing, receiving a predetermined number of additional beacons;
   determining whether at least one of the additional beacons are misaligned;
   when an additional beacon is misaligned:
      calculating a weighted score for the misaligned, additional beacon;
      selecting a misalignment pattern based on the weighted scores; and
      receiving another beacon using the selected misalignment pattern.

5. The method of claim 4, wherein the weighted score is based at least on a probability of repeating a beacon misalignment.

6. The method of claim 4, wherein each beacon in the one or more predetermined number of additional beacons arrive in intervals of at least one of the following:
   50 milliseconds;
   100 milliseconds;
   102.4 ms; and
   204.8 ms.

7. The method of claim 4, wherein receiving the predetermined number of additional beacons comprises receiving the predetermined number of consecutive additional beacons.

8. The method of claim 4, wherein determining whether the at least one of the additional beacons is misaligned comprises determining whether the at least one of the additional beacons is received prior to the scheduled timing.

9. The method of claim 4, wherein receiving the beacon comprises receiving a management frame that comprises a target beacon transmission time (TBTT) field.

10. The method of claim 4, wherein receiving the beacon comprises receiving the beacon from a wireless local area networks (WLAN) access point (AP).

11. The method of claim 4, wherein receiving the beacon comprises using a wireless communication protocol in accordance with an IEEE 802.11 standard.

12. The method of claim 4, wherein receiving the beacon comprises receiving the beacon with a computer or phone.

13. The method of claim 4, wherein receiving the beacon comprises receiving the beacon with a device, the method further comprising causing the device to go to sleep between reception of beacons.

14. The method of claim 4, wherein calculating the weighted score comprises calculating the weighted score based on a magnitude of a difference between the scheduled timing and corresponding reception times of the predetermined number of additional beacons.

15. The method of claim 4, wherein calculating the weighted score comprises using a score factor that is multiplied times a magnitude of a difference between the scheduled timing and a corresponding reception time of one of the additional beacons.

16. The method of claim 15, wherein the score factor is below 1.

17. The method of claim 16, wherein the score factor is 1/8, 1/4, 1/7, 1/10, 1/16, 1/20.

18. The method of claim 4, further comprising determining whether a misalignment pattern exist based on a comparison between the weighted score and a threshold.

19. The apparatus of claim 1, wherein receiving the predetermined number of additional beacons comprises receiving the predetermined number of consecutive additional beacons.

20. The apparatus of claim 1, wherein determining whether the at least one of the additional beacons are misaligned comprises determining whether the at least one of the additional beacons is received prior to the scheduled timing.

21. The apparatus of claim 1, wherein receiving the beacon comprises receiving a management frame that comprises a target beacon transmission time (TBTT) field.

22. The apparatus of claim 1, wherein receiving the beacon comprises receiving the beacon from a wireless local area networks (WLAN) access point (AP).

23. The apparatus of claim 1, wherein receiving the beacon comprises using a wireless communication protocol in accordance with an IEEE 802.11 standard.

24. The apparatus of claim 1, wherein the apparatus comprises a computer or phone.

25. The apparatus of claim 1, wherein the apparatus is configured to go to sleep between reception of beacons.

26. The apparatus of claim 1, wherein calculating the weighted score comprises calculating the weighted score based on a magnitude of a difference between the scheduled timing and corresponding reception times of the predetermined number of additional beacons.

27. The apparatus of claim 1, wherein calculating the weighted score comprises using a score factor that is multiplied times a magnitude of a difference between the scheduled timing and a corresponding reception time of one of the additional beacons.

28. The apparatus of claim 27, wherein the score factor is below 1.

29. The apparatus of claim 1, wherein the processing unit is further configured to determine whether a misalignment pattern exist based on a comparison between the weighted score and a threshold.

* * * * *